United States Patent [19]

Weiszbrod

[11] 4,295,170
[45] Oct. 13, 1981

[54] VARIABLE TAPE SPEED FOR VIDEO RECORDERS

[75] Inventor: David A. Weiszbrod, Moore, Okla.

[73] Assignee: Mike A. Janko, Oklahoma City, Okla.

[21] Appl. No.: 87,429

[22] Filed: Oct. 22, 1979

[51] Int. Cl.$^3$ .................. G11B 15/46; G11B 19/28
[52] U.S. Cl. ........................................ 360/73; 360/74.1
[58] Field of Search ............... 360/73, 71, 72.1, 72.3, 360/74.1, 14, 10

[56] References Cited

U.S. PATENT DOCUMENTS 4,040,098 8/1977 Beeson et al. .................. 358/127 X

*Primary Examiner*—John H. Wolff
*Attorney, Agent, or Firm*—Dunlap, Codding & McCarthy

[57] ABSTRACT

A speed control for varying the video tape speed which is adapted for use with the video tape recorder having a power supply providing a power signal and a capstan motor for driving the video tape in forward and reverse directions. The speed control includes: a capstan drive amplifier receiving the power signal and an input control signal for providing an output signal which is connected to the capstan motor and which is controllably variable in response to the control signal; and a variable speed control providing the controllably variable control signal which is connected to the capstan drive amplifier for controllably varying the output signal of the capstan drive amplifier thereby controllably varying the speed of the capstan motor.

11 Claims, 2 Drawing Figures

VARIABLE TAPE SPEED FOR VIDEO RECORDERS

BACKGROUND OF THE INVENTION

1. Field of the Invention

The present invention relates generally to video tape recorder controls and, more particularly, but not by way of limitation, to a speed control for controllably varying the speed of a capstan motor in a video tape recorder.

BRIEF DESCRIPTION OF THE PREFERRED EMBODIMENTS

Figure 1:
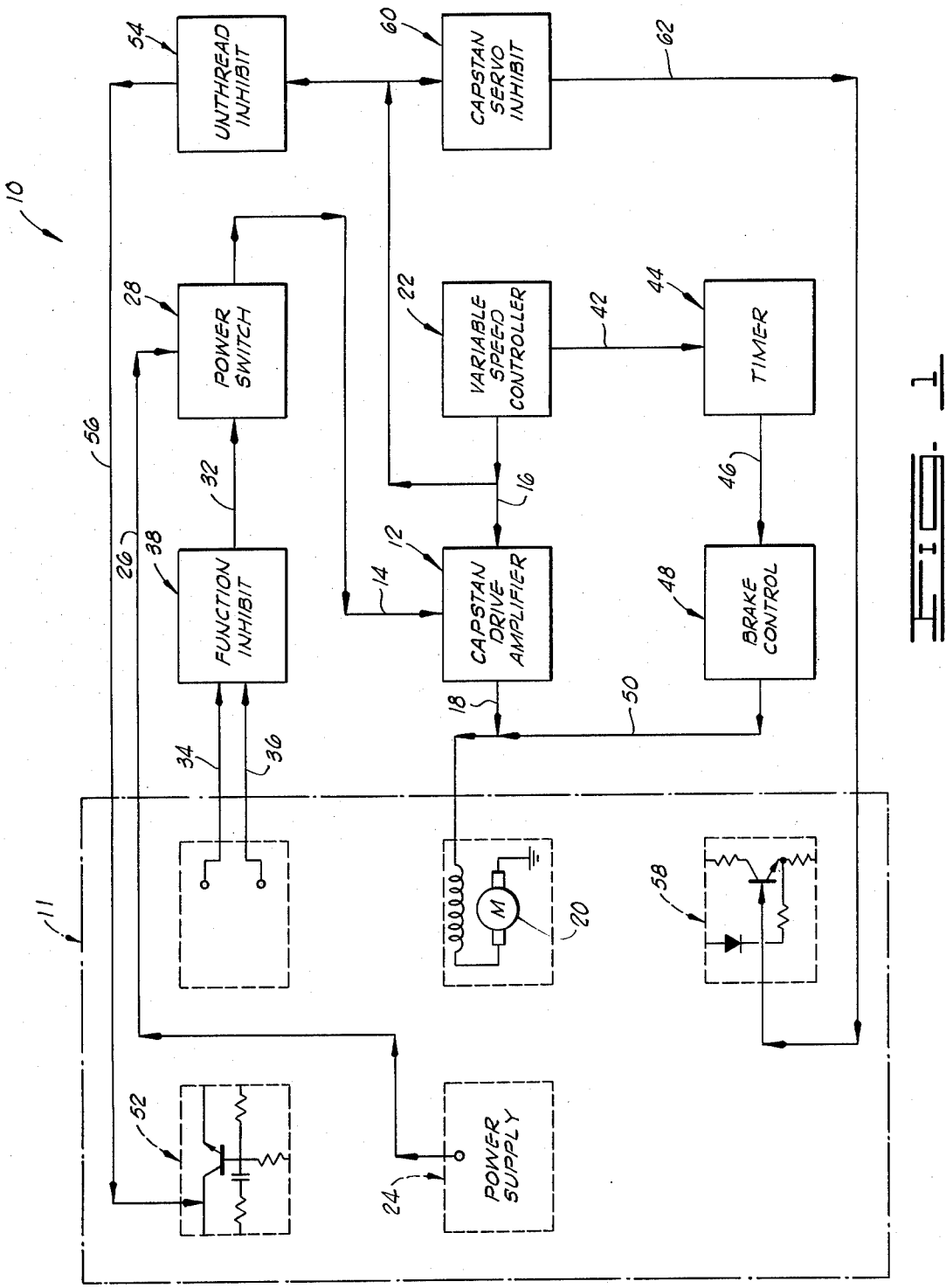
FIG. 1 is a diagrammatic, schematic view of a speed control constructed in accordance with the present invention, the elements representing portions of a commercially available video tape recorder being shown enclosed in dashed lines in FIG. 1.

In general, the present invention is adapted for use in connection with a video cassette recorder or, as sometimes referred to in the art, a video tape recorder. The particular embodiment of the invention, as shown in the drawings and as described in detail below, is adapted particularly for use with a video tape recorder of the type manufactured by Panasonic Company, Division of Matsushita Electric Corporation of America, Secaucus, N.J., such as the Panasonic Model No. PV-1100, for example, Since the construction and the operation of video tape recorders are well known in the art, only certain aspects of the construction and operation of such commercially available video tape recorders will be described herein.

A video tape recorder of the type described above is constructed to be connected to a commercially available television unit or set. The video tape recorder has a play mode wherein a video tape cassette, having material prerecorded on the video tape, is operatively engaged in the video tape recorder and the play mode button or lever is operatively engaged resulting in the prerecorded material being played on the screen of the television unit. The video tape recorder also has a record mode wherein a blank video tape cartridge is operatively engaged in the video tape recorder and the record button or lever is operatively engaged resulting in the material being received by the video tape recorder from a selected television channel being recorded on the video tape for playback at a later time.

The video tape cassette includes a pair of reels or capstans and opposite ends of the video tape are connected to the capstans. When the play mode or the record mode is activated, the video tape recorder operates to thread the video tape in the video tape cassette about the tape head and a capstan motor is engaged to drive one of the capstans at a predetermined rate of speed, thereby moving the video tape in a forward direction at a predetermined rate of speed about the tape head. Video tape cassettes of the type just described are commercially available from various manufacturers, and the construction and operation of such video tape cassettes are well known in the art.

The video tape recorder also includes a fast forward mode wherein the video tape is driven at an accelerated rate of speed in the forward direction and a reverse mode wherein the video tape in the video tape cassette is driven in the reverse direction, generally at an accelerated rate of speed with respect to the speed of the tape in the play or record modes of operation. When the video tape recorder is in the fast foward mode, the video tape is not threaded about the tape head and thus material recorded on the video tape is not displayable on a television screen in this mode of operation.

There are many instances when it is desirable to advance the video tape at a slower or a faster rate of speed as compared to the normal tape speed in the play mode of operation while still displaying the recorded material on a television screen, such as when one desires to advance the video tape faster through recorded commercial advertising or when one desires to stop the video tape to display a particular frame, commonly referred to as a "stop or freeze frame", for example. Utilizing the speed control of the present invention, the operator can control the rate at which the video tape is advanced in the play mode while leaving the tape threaded about the tape head so the recorded material is displayed on the television screen while advancing the video tape at various controlled rates of speed. In one embodiment, the speed control of the present invention was constructed to control the rate of speed of the video tape between zero and about five times the normal rate of tape speed, the normal rate of tape speed being the speed of the video tape when the video tape recorder is in the play mode and the speed control of the present invention is not operatively connected to the video tape recorder. Thus, utilizing the speed control of the present invention, the video tape can be advanced rapidly while maintaining recognizable picture and sound to enable the operator to identify the end of the portion desired to be omitted. The speed control of the present invention can also be utilized to advance the video tape at a slower rate of speed to permit the operator to examine more closely selected portions of the recorded material.

Referring to the drawings in general and to FIG. 1 in particular, shown therein and designated via the general reference numeral 10 is a speed control which is constructed in accordance with the present invention, a commercially available video tape recorder of the type referred to before being shown in FIG. 1 in dashed lines and designated via the reference numeral 11. In general, the speed control 10 includes a capstan drive amplifier 12 which is adapted to receive a power signal via a signal path 14 and a controllably variable control signal via a signal path 16, the capstan drive amplifier 12 providing an output signal on a signal path 18 which is connected to a capstan motor 20 in the video tape recorder 11. The output signal of the capstan drive amplifier 12 provided on the signal path 18 provides the operating power to the capstan motor 20 and the output signal of the capstan drive amplifier 12 is controllably variable in response to the input signal on the signal path 16. The speed of the capstan motor 20 is controlled by the signal on the signal path 18 and thus the speed of the capstan motor 20 is varied in response to the output signal on the signal path 18 provided by the capstan drive amplifier 12 as controlled by the control signal on the signal path 16. In one operable embodiment, the capstan drive amplifier 12 provides a direct current output signal on the signal path 18 and, in this embodiment, the capstan motor 20 is a direct current type of electric motor, the speed of the capstan motor 20 being varied in response to the direct current output signal provided on the signal path 18 by the capstan drive amplifier 12.

The control signal on the signal path 16 is provided by a variable controller 22 which is constructed to be manually operated. The variable controller 22 provides a controllably variable control signal on the signal path 16 which is connected to the capstan drive amplifier 12 for controllably varying the direct current output provided on the signal path 18 via the capstan drive amplifier 12. Thus, an individual manually controls the speed of the capstan motor 20 by manually operating the variable controller 22 during the operation of the speed control 10 of the present invention.

The video tape recorder 11 includes an operating power supply 24 and the speed control 10 of the present invention is constructed to be utilized in conjunction with the power supply 24 in existing, commercially available video tape recorders. The power supply 24 provides an output power signal on a signal path 26.

A power switch 28 is interposed between the power supply 24 and the capstan drive amplifier 12. The power switch 28 receives the power signal on the signal path 26. The power switch 28 has a "on" position and a "off" state and the power switch 28 is constructed to provide the power signal on the signal path 14 in the "on" state of the power switch 28. The power switch 28 receives an input signal on a signal path 32 and the power switch 28 is constructed to be conditioned in the "on" state and in the "off" state in response to the signal received on the signal path 32. Thus, in the "on" state of the power switch 28, the power signal provided by the power supply 24 is connected to the capstan drive amplifier 12 via the power switch 28.

The video tape recorder 11 includes a transport control circuit which provides one signal indicating that the video tape recorder 11 is in the play mode of operation and another signal indicating that the video tape recorder 11 is not in the record mode of operation. As shown in FIG. 1, a signal path 34 is operatively connected to the transport control circuit of the video tape recorder 11 such that a signal is applied on the signal path 34 indicating that the video tape recorder 11 is not in the record mode of operation. A signal path 36 is operatively connected to the transport control circuit of the video tape recorder 11 such that a signal is applied on the signal path 36 indicating that the video tape recorder is in the play mode of operation.

The signal paths 34 and 36 are each connected to a function inhibit 38. The function inhibit 38 is constructed to receive the signals on the signal paths 34 and 36 indicating the video tape recorder 11 is not in the record mode and the video tape recorder 11 is in the play mode of operation, respectively, and to provide an output signal on the signal path 32 in response to receiving signals on the signal paths 34 and 36 indicating the video tape recorder 11 is in the play mode of operation. The function inhibit 38 is constructed such that a signal is not provided on the signal path 32 in response to receiving signals on the signal paths 34 and 36 indicating that the video tape recorder 11 is being operated in the record mode of operation or is not being operated in the play mode of operation.

When the signals on the signal paths 34 and 36 indicate that the video tape recorder 11 is being operated in the play mode of operation, the function inhibit 38 provides an output signal on the signal path 32 for conditioning the power switch 28 in the "on" state, the power switch 28 providing the power signal on the signal path 14 in response to receiving this signal on the signal path 32. When the signals received on the signal paths 34 and 36 indicate that the video tape recorder 11 is being operated in the record mode of operation or is not being operated in the play mode of operation, the function inhibit 38 does not provide a signal on the signal path 32 and thus the power switch 28 remains conditioned in the "off" state, the power switch 28 being constructed such that the power signal is not provided on the signal path 30 in the "off" state.

Thus, the function inhibit 38 and the power switch 28 cooperate such that a power signal is connected to the capstan drive amplifier 12 via the signal path 14 only when the video tape recorder 11 is being operated in the play mode of operation and a power signal is not provided on the signal path 14 to the capstan drive amplifier 12 when the video tape recorder 11 is being operated in the record mode of operation. The power switch 28 and the function inhibit 38 cooperate to disable the speed control 10 when the video tape recorder 11 is being operated in any mode of operation other than the play mode of operation since the power signal is connected to the capstan drive amplifier 12 via the signal path 14 only when the video tape recorder 11 is being operated in the play mode of operation. In this manner, the function inhibit 38 and the power switch 28 cooperate to prevent tape damage when the video tape recorder 11 is in the fast forward or reverse modes of operation and to prevent fouling or distorting of the recording when the video tape recorder 11 is being operated in the record mode of operation by disabling the speed control 10.

The variable controller 22 has an "on" position and a "off" position. In the "on" position, the variable controller 22 operates to provide the controllably variable control signal on the signal path 16 for controlling the output signal of the capstan drive amplifier 12 in the manner described before. In the "off" position, the variable controller 22 is not operable to provide the control signal. The variable controller 22 is constructed such that, when the variable controller 22 is switched from the "on" position to the "off" position, the variable controller 22 provides an output timer control signal on a switch path 42.

A timer 44 receives the timer control signal provided on the signal path 42 and provides a brake initiate signal on a signal path 46 in response to receiving the timer control signal on the signal path 42. More particularly, the timer 44 is constructed to provide the brake initiate signal for a predetermined period of time after receiving the timer control signal indicating that the variable controller 22 has been switched from the "on" position to the "off" position.

A brake control 48 receives the brake initiate signal on the signal path 46 and the brake control 48 is constructed to provide a brake signal on the signal path 50, the brake signal being applied to the signal path 50 by the brake control 48 during the period of time the brake initiate signal is being provided to the brake control 48 on the signal path 46. The capstan motor 20 includes a dynamic brake and a capstan motor flywheel and the brake signal on the signal path 50 provided by the brake control 48 is connected to the capstan motor 20 for engaging the dynamic brake of the capstan motor 20 to slow the capstan motor flywheel to return the capstan motor 20 to normal play mode speed in a reduced period of time.

The video tape recorder 11 includes a reel stop detector 52 which provides a command signal for causing the video tape to be unthreaded from the tape head and returned to the video cassette when the video tape recorder 11 senses the end of the video tape. When the variable controller 22 is operatively positioned to provide a control signal on the signal path 16 to control the capstan drive amplifier 12 to provide an output signal on the signal path 18 for stopping the capstan motor 20 or, in other words, when the variable controller 22 is operated to position the system in a "still frame" position, the control circuitry of the video tape recorder 11 would sense this as a malfunction and unthread the video tape from the tape head if not inhibited. The speed control 10 includes an unthread inhibit 54 which receives the control signal provided by the variable controller 22 on the signal path 16 and the unthread inhibit 54 is constructed to provide a shunt signal on a signal path 56 in response to receiving a control signal from the variable controller 22 on the signal path 16 indicating the system is in the stop frame mode of operation. The shunt signal on the signal path 56 is connected to the reel stop detector 52 in such a manner that the reel stop detector 52 is inhibited or prevented from providing the command signal to unthread the video tape from the tape head in this mode of operation.

The video tape recorder 11 includes a capstan servo amplifier 58 which is constructed to provide an output signal to the capstan motor 20 for preventing the capstan motor 20 from operating below normal speed; that is, the speed of the capstan motor 20 when the video tape recorder 11 is operating in the play mode of operation without the speed control 10 of the present invention being operatively connected thereto. The speed control 10 includes a capstan servo inhibit 60 which receives the control signal provided by the variable controller 22 on the signal path 16. The capstan servo inhibit 60 is constructed to provide an output disable signal in response to receiving a control signal on the signal path 16 indicating the variable controller 22 is in the "on" position. The disable signal provided on the signal path 62 is connected to the capstan servo amplifier 58 in such a manner that the capstan servo amplifier 58 is inhibited from providing the output signal for preventing the capstan motor 20 from operating below normal speed in response to receiving the disable signal provided by the capstan servo inhibit 60 on the signal path 62.

When the variable controller 22 is switched from the "off" position to the "on" position a control signal is provided by the variable controller 22 on the signal path 16. In response to a control signal being provided on the signal path 16, the unthread inhibit 54 provides the shunt signal on the signal path 56 to shunt the reel stop detector 52 for preventing the reel stop detector 52 from providing the command signal to cause the video tape to be unthreaded and the capstan servo inhibit 60 provides the disable signal on the signal path 62 to inhibit or prevent the capstan servo amplifier 58 from providing an output signal to the capstan motor 20 which would prevent the capstan motor 20 from being operated below normal speed. If the video tape recorder is in the play mode, the function inhibit 38 provides an output signal on the signal path 32 which causes the power switch 28 to be switched to the "on" position wherein the power switch 28 provides the power signal on the signal path 14, the power signal being applied to the power switch 28 by the power supply 24. The power signal on the signal path 14 is connected to the capstan drive amplifier 12 and the capstan drive amplifier 12 output signal on the signal path 18 is controllably varied by the control signal on the signal path 16 provided by the variable controller 22. In this condition, the operator manually manipulates the variable controller 22 to vary the control signal 16 thereby varying the capstan drive amplifier 12 output signal 18 or in other words, the operator manually positions the variable controller 22 to controllably vary the control signal 16 to controllably vary the capstan drive amplifier 12 output signal on the signal path 18 thereby varying the speed of the capstan motor 20. By varying the control signal 16, the operator can manually adjust the speed of the capstan motor 20 and thus vary the speed at which the video tape is driven through the video tape recorder 11 as desired within a range from zero to a maximum speed, the maximum speed being about five times the normal video tape speed in one operable embodiment.

When the variable controller 22 is switched from the "on" position to the "off" position, the variable controller 22 provides a timer control signal on the signal path 42 and the timer 44 provides the brake initiate signal on the signal path 46 in response to receiving the timer control signal. The timer 44 provides the brake initiate signal for a predetermined period of time and the brake control 48 provides a brake signal on the signal path 50 for the period of time during which the brake initiate signal is being supplied by the timer 44. The brake signal on the signal path 50 causes the capstan motor 20 to be returned to the normal play mode speed in a substantially controlled, faster manner.

Figure 2:
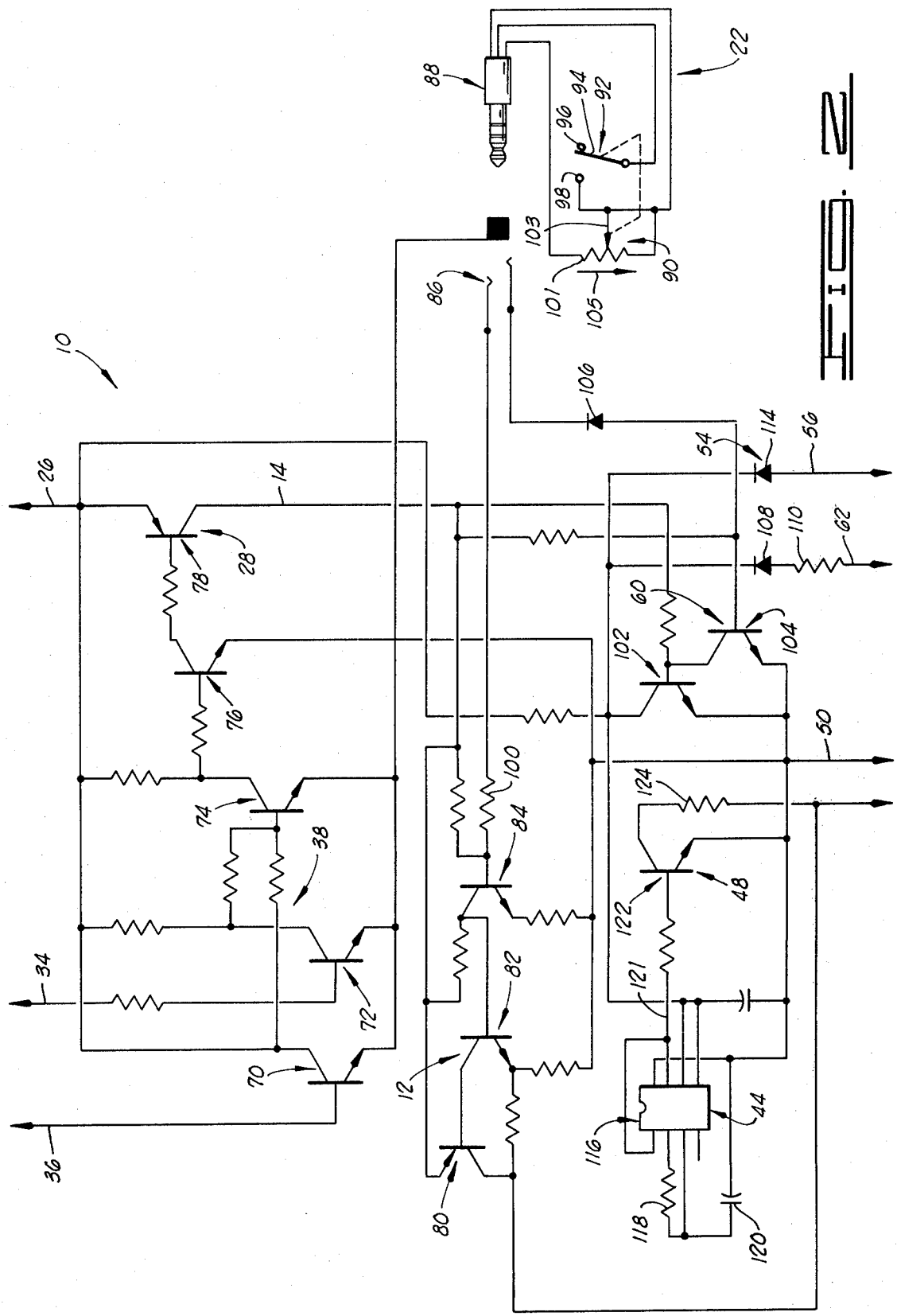
FIG. 2 is a schematic view of the variable speed control of FIG. 1.

One preferred embodiment of the speed control 10 is shown in greater detail in FIG. 2. As shown in FIG. 2, the function inhibit 38 comprises switch transistors 70 and 72, a gate transistor 74 and a switch transistor 76. The switch transistor 70 has an "on" and an "off" state, the switch transistor 70 providing an output signal in the "on" state of the switch transistor 70. The signal path 36 is connected to the base of the switch transistor 70 and, when a signal is applied to the signal path 36 indicating that the video tape recorder 11 is being operated in the play mode of operation, the switch transistor 70 is turned "on".

The switch transistor 72 has an "on" and an "off" state. The signal path 34 is connected to the base of the switch transistor 72 and, when a signal is applied to the signal path 34 indicating that the video tape recorder 11 is being operated in the record mode of operation, the switch transistor 72 is turned "on", the switch transistor 72 providing an output signal in the "on" state.

In the embodiment of the invention as shown in FIG. 2, a positive voltage is applied to the signal path 36 when the video tape recorder 11 is being operated in the play mode of operation and a positive voltage signal is applied to the signal path 34 only when the video tape recorder 11 is not being operated in the record mode of operation. Thus, when the video tape recorder 11 is being operated in the record mode of operation, a positive voltage signal is not applied to the signal path 34. In one operational embodiment of the invention, a 12 volt dc signal is applied to the signal path 36 when the video tape recorder 11 is being operated in the play mode of operation and a 12 volt dc signal is applied to the signal path 34 when the video tape recorder is not being operated in the record mode of operation.

The switch transistors 70 and 72 are each connected to the base of the gate transistor 74. In the "on" state of the switch transistors 70 and 72, a voltage is not applied to the base of the gate transistor 74 and, in this state, the gate transistor 74 is turned "off". In other words, when the video tape recorder 11 is being operated in the play mode of operation, a voltage is not applied to the base of the gate transistor 74 and, in this state, the gate transistor 74 is turned "off".

The gate transistor 74 is connected to the base of the switch transistor 76. When the gate transistor 74 is turned "off" indicating that the video tape recorder 11 is being operated in the play mode of operation, a voltage is applied to the base of the switch transistor 76 thereby turning the switch transistor 76 "on".

The power switch 28 comprises a switch transistor 78 and the base of the switch transistor 78 is connected to the collector of the switch transistor 76 of the function inhibit 38. When the switch transistor 76 is turned "on" indicating that the video tape recorder 11 is being operated in the play mode of operation, the switch transistor 78 of the power switch 28 is turned "on". The emitter of the switch transistor 78 is connected to the signal path 26 and, when the switch transistor 78 is turned "on" indicating that the video tape recorder 11 is being operated in the play mode of operation, the switch transistor 78 functions to apply the power signal received on the signal path 26 to the signal path 14.

When the video tape recorder 11 is being operated in the record mode of operation, a positive voltage signal is not applied to the signal path 34 and the positive voltage signal is not applied to the signal path 36. Thus, in this condition, the switch transistors 70 and 72 are each in the "off" state thereby causing the gate transistor 74 and the switch transistor 76 to each be conditioned in the "off" state. In the "off" state of the switch transistor 76, the switch transistor 78 of the power switch 28 is in the "off" state and the power signal connected to the emitter of the switch transistor 78 is not applied to the signal path 14.

In the embodiment shown in FIG. 2, the transistor amplifiers 80, 82 and 84 are direct current amplifiers and these amplifiers 80, 82 and 84 comprise the capstan drive amplifier 12 for providing the direct current signal to the capstan motor 20 for controllably varying the speed of the capstan motor 20. The input to the amplifiers 80, 82 and 84 is through the base of the amplifier 84 which is connected to the variable controller 22 via a plug 86 and a jack 88. As shown in FIG. 2, the plug 86 is disconnected from the jack 88 and, when the jack 88 is inserted into the plug 86, the variable controller 22 is connected to the base of the amplifier 84. In this embodiment, the variable controller 22 can be connected to and disconnected from the rest of the circuitry comprising the speed control 10 and thus the remote controller 22 can be remotely located for convenience of the operator in operating the speed control 10 of the present invention.

The variable controller 22 includes a variable resistor 90 which is connected to a switch 92 having a switch arm 94. The switch arm 94 is movable to an "off" position 96 wherein the variable resistor 90 is disconnected from the plug 88 or, more particularly, wherein electrical continuity is interrupted between the variable resistor 90 and the plug 88. The switch arm 94 also is movable to an "on" position 98 wherein electrical continuity is established between the variable resistor 90 and the plug 88. More particularly, when the jack 88 is connected to the plug 86, and the switch arm 94 is in contact with the "off" position 96, electrical continuity is interrupted between the variable resistor 90 and the capstan drive amplifier 12 or, in other words, the base of the transistor 84. When the jack 86 is connected to the plug 88 and the switch arm 94 is positioned in the "on" position 98, electrical continuity is established between the variable resistor 90 and the capstan drive amplifier 12 or, more particularly, the base of the transistor amplifier 84. When the switch arm 94 is in the "on" position 96 and the jack 88 is connected to the plug 86, the variable resistor 90 is in electrical series with a resistor 100 which is connected to the base of the amplifier 84.

The variable resistor 90 includes a resistor 101 and a movable contact arm 103. The contact arm 103 is movable to vary the effective resistance of the resistor 101 in a manner well known in the art.

To position the variable controller 22 to control the capstan drive amplifier 12 to rotate the capstan motor 20 at a maximum speed, the contact arm 103 is moved in the direction 105 to a position wherein the effective resistance of the resistor 101 is at a minimum. When the effective resistance of the resistor 101 is at a minimum or least resistance position, the transistor amplifier 84 is turned "on", the transistor amplifier 82 is turned "off" and the transistor amplifier 80 is turned "on". In this state, the transistor amplifier 80 acts or functions like a closed switch allowing the power signal (a positive 18 volts dc) which is connected to the emitter of the amplifier 80 to be applied to the capstan motor 20. In other words, in this state, the full voltage supplied by the power supply 24 is connected to the capstan motor 20 through the power switch 28 and the transistor amplifier 80 of the capstan drive amplifier 12.

As shown in FIG. 2, the capstan servo inhibit 60 comprises a pair of switch transistors 102 and 104 and a diode 106. The base of the switch transistor 104 is connected to the variable controller 22 via a diode 106. When the variable controller 22 is in the "on" position, the cathode of the diode 106 is grounded which causes the switch transistor 104 to be turned "off". The collector of the switch transistor 104 is connected to the base of the switch transistor 102 and, in the "off" state of the switch transistor 104, the switch transistor 102 is conditioned in the "on" state.

The capstan servo inhibit 60 also includes a diode 108. The capstan servo inhibit 60 is connected to the capstan servo amplifier 58 via the signal path 62, the signal path 62 being more particularly connected to the emitter of the switch transistor 102, as shown in FIG. 2. The diode 108 is interposed in the signal path 62 generally between the capstan servo amplifier 58 and the collector of the switch transistor 102.

When the variable controller 22 is switched to the "on" position, the cathode of the diode 106 is grounded and the grounding of the cathode of the diode 106 causes the switch transistor 104 to be switched to the "off" state. When the switch transistor 104 is switched to the "off" state, the switch transistor 102 is switched to the "on" state. When the switch transistor 102 is in the "on" state, the signal path 62 provides a ground path through a resistor 110 which is interposed in the signal path 62, the diode 108 and the switch transistor 102. The signal path 62 is connected to the capstan servo amplifier 58 such that, when the switch transistor 102 is in the "on" state indicating that the variable controller 22 is in the "on" position, the servo dc amplifiers in the capstan servo amplifier 58 are grounded through the resistor 110, the diode 108 and the switch transistor 102. The grounding of the servo dc amplifiers and the capstan servo amplifier 58 disables or inhibits the capstan servo amplifier 58 from functioning to apply a predetermined servo direct current voltage to the capstan motor 20 thereby permitting the transistor amplifier 80 to supply the dc voltage to the capstan motor 20 and thus control the speed of the capstan motor 20.

The unthread inhibit 54 comprises a diode 114 which is interposed in the signal path 56 connecting the unthread inhibit 54 to the reel stop detector 52. When the variable controller 22 is in the "off" position, the signal path 56 is grounded through the diode 114 and the switch transistor 102 in a manner similar to that described before with respect to the diode 108.

The timer 44 comprises a time delay circuit 116 which, in one embodiment, is an integrated circuit constructed to be turned on or conditioned in the "on" state for a predetermined interval of time, the interval of time being determined by a resistor 118 and a capacitor 120 which are connected to the time delay circuit 116. The input of the time delay circuit 116 is connected to the collector of the transistor switch 102.

When the variable controller 22 is switched to the "off" position, the collector of the transistor switch 102 goes high thereby providing a high input signal to the time delay circuit 116. In response to receiving a high input signal, the time delay circuit 116 provides a high output signal on a conductor 121 for the preset or predetermined interval or period of time.

The brake control 48 comprises a switch transistor 122. The time delay circuit 116 output signal on the conductor 121 is connected to the base of the switch transistor 122 and the collector of the transistor switch 122 is connected to the capstan motor 20 through a resistor 124 which is interposed in the signal path 50.

When the transistor switch 122 is in the "on" state, the transistor switch 122 functions to short the signal path 50 thereby grounding the end portion of the capstan motor 20 which is connected to the signal path 50. The transistor switch 122 remains in the "on" state as long as the time delay circuit 116 output signal on the conductor 121 is in the high state or, in other words, during the predetermined interval of time during which the time delay circuit 116 provides the output signal on the conductor 121. Thus, the transistor switch 122 grounds the capstan motor 20 for the preset or predetermined interval of time thereby causing the capstan motor 20 to suddenly brake downward in speed or, in other words, causing the capstan motor 20 to brake downward in speed in a relatively faster period of time. The variable controller 22, the time delay circuit 116 and the transistor switch 122 cooperate to brake the capstan motor 20 and cause the speed of the capstan motor 20 to be reduced to the normal capstan motor 20 speed in a relatively faster period of time, the normal capstan motor 20 speed being that speed at which the capstan motor 20 rotates when the video tape recorder 11 is in the play mode and disconnected from the speed control 10 of the present invention. When the capstan motor 20 is operating at a speed slower than the normal capstan motor 20 speed the effect of the time delay circuit 116 and the transistor switch 122 on the capstan motor 20 is nil.

In one operable embodiment, the capstan motor 20 was supplied with a seven (7) volt dc power signal during standard or normal operations of the video tape recorder; that is, during the operation of the video tape recorder in the play mode disconnected from the speed control 10 of the present invention. The power supply 24 supplied an eighteen (18) volt dc signal and the capstan drive amplifier 12 operated to apply from zero to eighteen (18) volts dc to the capstan motor 20. In this embodiment, the speed control 10 operated to controllably vary the speed of the capstan motor 20 from zero to about four and one-half to five times normal capstan motor speed. When the video tape was driven at maximum speed, it would require about three (3) seconds for the capstan motor 20 to coast down to the normal operating speed of the capstan motor 20 when the timer 44 and the brake control 48 were not utilized to brake the capstan motor 20. The timer 44 in the brake control 48 operated to brake the capstan motor 20 to return the capstan motor 20 to normal speed in a shorter period of time and, in this particular operable embodiment, the timer 44 and the brake control 48 operated to reduce the speed of the capstan motor 20 from maximum speed to normal speed in about one second or less. Further, in this operable embodiment, the video tape recorder applied a twelve (12) volt dc signal to the signal path 34 when the video tape recorder was not being operated in the record mode of operation and the video tape recorder applied a twelve (12) volt dc signal to the signal path 36 when the video tape recorder was being operated in the play mode of operation.

Changes may be made in the construction and the operation of the various elements of the speed control disclosed herein without departing from the spirit and the scope of the invention as defined in the following claims.

What is claimed is:

1. A speed control adapted for use with a video tape recorder having a play mode, a record mode, a power supply providing a power signal, a capstan motor for driving the video tape in a forward direction, a reel stop detector which provides a command signal for causing the video tape to be unthreaded and returned to a video cassette, and a capstan servo amplifier which provides an output signal to the capstan motor for preventing the capstan motor from being operated below normal speed, the video tape recorder providing an output signal indicating the video tape recorder is in the play mode of operation, the speed control comprising:

a capstan drive amplifier adapted to receive the power signal and an input control signal, the capstan drive amplifier providing an output signal connectable to the capstan motor and the speed of the capstan motor being varied in response to the variations in the capstan drive amplifier output signal, the capstan drive amplifier output signal being controllably variable in response to the input control signal;

a variable controller, having an "on" position and an "off" position, the variable controller providing the controllably variable control signal, the variable controller control signal being connected to the capstan drive amplifier for controllably varying the output signal of the capstan drive amplifier;

an unthread inhibit receiving the output signal provided by the variable controller and providing an output shunt signal in response to receiving the output signal from the variable controller, the shunt signal being connectable to the reel stop detector in the video tape recorder for preventing the reel stop detector from providing the command signal; and a capstan servo inhibit receiving the output control signal provided by the variable controller and providing and output disable signal in response to receiving the control signal, the output disable signal being connectable to the capstan servo amplifier in the video tape recorder to inhibit the capstan servo amplifier from providing the output signal to the capstan motor for preventing the capstan motor from operating below normal speed.

2. The speed control of claim 1 defined further to include:

a power switch, having an "on" and an "off" state, interposed between the power supply and the capstan drive amplifier, the power switch receiving the power signal from the power supply and providing the power signal via an output signal in the "on" state of the power switch, the power switch being adapted to receive an input signal for positioning the power switch in the "on" state and in the "off" state, the power switch disconnecting the power signal from the capstan drive amplifier in the "off" state of the power switch.

3. The speed control of claim 2 defined further to include:

a function inhibit receiving the output signal from the video tape recorder indicating the video tape recorder is being operated in the play mode and providing an output signal in response to receiving the signal indicating the video tape recorder is being operated in the play mode, the function inhibit output signal being received by the power switch and the power switch being conditioned in the "on" state in response to receiving the function inhibit output signal indicating the video tape recorder is being operated in the play mode.

4. The speed control of claim 3 wherein the video tape recorder provides an output signal indicating the video tape recorder is not being operated in the record mode and wherein the function inhibit is defined further as receiving the output signal indicating the video tape recorder is not being operated in the record mode and providing the output signal in response to receiving the signal indicating the video tape recorder is being operated in the play mode and the signal indicating the video tape recorder is not being operated in the record mode.

5. The speed control of claim 4 wherein the function inhibit is defined further to include:

a gate transistor receiving the signal indicating the video tape recorder is being operated in the play mode and receiving the signal indicating the video tape recorder is not being operated in the record mode, the gate transistor having an "on" state and an "off" state and the gate transistor being conditioned in the "on" state in response to receiving the signal indicating the video tape recorder is operating in the play mode and receiving the signal indicating the video tape recorder is not being operated in the record mode; and wherein the power switch is defined further to include:
a switch transistor having an "on" state and an "off" state, the switch transistor receiving the power signal and providing the power signal in the "on" state of the switch transistor, the switch transistor being connected to the gate transistor and the switch transistor being conditioned in the "on" state in response to the gate transistor being condensed in the "off" state indicating the video tape recorder is being operated in the play mode and not being operated in the record mode of operation.

6. The speed control of claim 1 wherein the variable controller provides the output control signal in the "on" position, the variable controller providing an output timer control signal in response to the variable controller being switched from the "on" position to the "off" position, and wherein the video tape recorder capstan motor includes a dynamic brake and a capstan motor flywheel and, wherein the speed control is defined further to include:

a timer receiving the timer control signal from the variable controller and providing a break initiate signal in response to receiving the timer control signal, the timer providing the break initiate signal for a predetermined period of time after receiving the timer control signal; and a brake control receiving the break initiate signal and providing a brake signal in response thereto, the brake control providing the brake signal during the period of time the brake initiate signal is being provided by the timer, the brake signal being connectable to the capstan motor for engaging the dynamic brake of the capstan motor for reducing the speed of the capstan motor and returning the capstan motor to the speed at which the capstan motor rotates during the play mode of operation.

7. The speed control of claim 6 wherein the timer is defined further as providing an output signal in the high state in response to receiving the timer control signal, the timer output signal being the brake initiate signal, and wherein the brake control is defined further to include:

a switch transistor receiving the brake initiate signal from the timer, the switch transistor having an "on" and an "off" state and the switch transistor being conditioned in the "on" state in response to receiving a brake initiate signal in the high state, the switch transistor being connected to the dynamic motor and the switch transistor providing a ground path in the "on" state of the switch transistor, the ground path being the brake signal provided by the brake control.

8. The speed control of claim 1 wherein the unthread inhibit is defined further to include:

a diode connected to the variable controller and connectable to the reel stop detector in the video recorder, the diode providing a ground path in response to the variable controller being switched to the "on" position for grounding the reel stop detector and preventing the reel stop detector from providing the command signal.

9. the speed control of claim 1 wherein the capstan servo inhibit is defined further to include:

a switch transistor connected to the variable controller and connectable to the capstan servo amplifier in the video tape recorder, the switch transistor having an "on" state and an "off" state and the switch transistor being conditioned in the "on" state in response to the variable controller being positioned in the "on" position; and a diode connected to the switch transistor and connectable to the capstan servo amplifier in the video tape recorder, the diode being interposed between the switch transistor and the capstan servo amplifier in the video tape recorder, the diode and the switch transistor providing a ground path in the "on" state of the switch transistor and the capstan servo amplifier in the video tape recorder being grounded through the diode and the switch transistor in the "on" state of the switch transistor, the ground path provided by the diode and the swich transistor being the disable signal provided by the capstan servo inhibit.

10. The speed control of claim 1 wherein the variable controller is defined further to include:

a variable resistor, the resistance of the variable resistor being controllably variable and the controllably variable resistance of the variable resistor cooperating to provide the control signal of the variable controller; and a switch having an "on" position and an "off" position connected to the variable resistor, electrical continuity being established between the variable resistor and the capstan drive amplifier in the "on" position of the switch and electrical continuity being interrupted between the variable resistor and the capstan drive amplifier in the "off" position of the switch.

11. The speed control of claim 1 wherein the capstan motor in the video tape recorder is a dc motor, the power supply in the video tape recorder is a dc power supply, and wherein the capstan drive amplifier provides a variable direct current output signal for controlling the speed of the capstan drive motor.

* * * * *